United States Patent [19]

Showalter

[11] Patent Number: 4,726,695

[45] Date of Patent: Feb. 23, 1988

[54] HYDRODYNAMIC THRUST BEARING

[75] Inventor: Merle R. Showalter, Madison, Wis.

[73] Assignee: Anatech, Inc., Madison, Wis.

[21] Appl. No.: 873,356

[22] Filed: Jun. 12, 1986

[51] Int. Cl.$^4$ .................. F16C 32/06; F16C 17/06
[52] U.S. Cl. .................. 384/121; 384/123; 384/125; 384/426
[58] Field of Search ........ 384/100, 103, 105, 107–113, 384/121–125, 368, 371, 420, 425, 426

[56] References Cited

U.S. PATENT DOCUMENTS

| | | | |
|---|---|---|---|
| 1,457,081 | 5/1923 | Lieber | 384/125 |
| 2,615,766 | 10/1952 | Wallace | 384/420 |
| 3,364,866 | 1/1968 | Sato | 384/122 X |
| 3,788,713 | 1/1974 | Kraus | 384/125 |
| 4,315,660 | 2/1982 | Glienicke | 384/103 |
| 4,385,845 | 5/1983 | Hoshino | 384/123 |

FOREIGN PATENT DOCUMENTS

| | | | |
|---|---|---|---|
| 1575548 | 7/1970 | Fed. Rep. of Germany | 384/123 |
| 499419 | 1/1976 | U.S.S.R. | 384/121 |

OTHER PUBLICATIONS

Fuller, Dudley D., *Theory and Practice of Lubrication for Engineers*, John Wiley & Sons, 12/84, pp. 452–469.

*Primary Examiner*—Stuart S. Levy
*Assistant Examiner*—Thomas R. Hannon
*Attorney, Agent, or Firm*—Witherspoon & Hargest

[57] ABSTRACT

A hydrodynamic thrust bearing adapted for positioning between a fixed base and a moving member spaced from said fixed base, the moving member having a rigid flat face confronting the fixed base, wherein the hydrodynamic thrust bearing includes a thin metal disk having undulations extending radially outward from the center of the disk in a symmetrical manner throughout one entire surface of the metal disk, and a planar face on the other side, the disk is positioned between the fixed base and the rigid flat face of the moving member whereby the undulations of the disk are in contact with the rigid flat face and the planar face is in contact with the fixed base, lubricant is supplied between the disk undulation and the confronting rigid flat face of the moving member whereby thrust movement relative to the disk will produce a very thin film of lubricant between the undulations of the disk and the cooperating rigid flat face of the fixed base.

5 Claims, 6 Drawing Figures

HYDRODYNAMIC THRUST BEARING

BACKGROUND AND OBJECTS OF THE INVENTION

This invention relates to thrust bearings and more particularly hydrodynamic thrust bearings adapted to function with very thin lubricant films.

Thrust bearings form important elements of many machines, including many machine tools. Currently most thrust bearings of the hydrodynamic type have two drawbacks: excessive friction and wear. Ball or roller thrust bearings have some limitations with respect to cost, durability, tolerance capability and load capacity. Research at the inventor's laboratory has indicated that the loadbearing potential of hydrodynamic bearings has been greatly underestimated because the effect of contact (Hertzian) deformations, which alter the shape of the sliding parts under load in a highly desirable way, has not been adequately understood. Enough analytical understanding of the relevant effects now exists to produce very effective and inexpensive hydrodynamic thrust bearings.

Hydrodynamic fluid mechanics is so ubiquitous in technology that it is easy to forget what a fine scale phenomenon it is. Very thin lubricant films of oil or grease are involved, often less than 0.0001" thick. Convergent angles between sliding parts for best load capacity are remarkably small, frequently 0.003"/ft. or less. The physics of hydrodynamic fluid mechanics happen on very fine scales, and involve equations which are relativey difficult to manipulate, even for professionals.

In the current thrust bearing, the scale of the convergent surfaces which produce the hydrodynamic action involves a peak to valley wave height of a few tenths of a thousandth of an inch to a few thousandths of an inch. These very shallow radial waves are what is required for good hydrodynamic function. A number of methods of making disk-shaped thrust bearings with this degree of surface waviness are disclosed in this case. But a significant consequence of the very fine scale geometry of the thrust bearing or any other hydrodynamic bearings requires emphasis. This consequence is the major contribution which deformation makes to the performance of any hydrodynamic bearing.

At the scales which matter for hydrodynamic bearing function, structural materials, including steel, deform significantly under load. For example, consider a surface wave having a radius of curvature of 2000", with a load of 200 lbs. for 1" radially along the radial wave, bearing against a flat rigid surface. The constant radius of curvature wave will deform so that, if there is no sliding, there will be surface contact over a circumferential length of 0.35". With sliding, the deformations of the surface produce a convergence geometry with much higher full-film load-bearing capacity than would occur if the surfaces were infinitely stiff.

The thrust bearing of the present invention is essentially a wavy disk, or a stack of wavy disks, with the waves radial from the center of the disk and the peak-to-valley wave height from 0.006" to 0.0005". The disks will operate as thrust bearings on either grease or oil and operate best at least partly submerged in lubricant. A central oil feed provides a good source of lubricant and cooling to the thrust bearing disks when a source of pressure oil is available. Radial oil supply grooves in the low portion of the surface wave assist lubrication.

When particles in the lubricant oil or grease are a problem, it may be highly desirable to have the wavy thrust bearing disk slide against a disk covered with a thin layer (0.030"–0.002") of elastomer. Such an elastomer layer is extremely stiff, and has excellent embeddibility of particles to minimize or eliminate wear, and operates well at low speeds.

The thickness of the thrust bearing disk depends on a number of variables some of which are thrust loads to be carried, the kind of material from which the disk is to be made and the temperatures to be encountered in bearing operation. Variables such as type of lubricant can obviously have a great effect on bearing thickness. It must be remembered that the loads should cause the curvature of the undulations to grow greater and thereby lesser the effective lubricant film to down as low as 0.0001" thickness.

In view of the foregoing it is an object of this invention to provide a thrust bearing in the form of a disk or a round plate having radially extending undulations completely around the surface thereof, said undulations bearing against a rigid planar bearing base with lubricant between the rigid planar bearing base and the undulating surface bearing thereagainst.

It is another object of this invention to provide a hydrodynamic thrust bearing comprising a plurality of disks with radially extending undulations on both surfaces with rigid flat bearing bases interposed therebetween so that every undulating surface bears against a rigid flat bearing surface with lubricant provided between all of said surfaces.

It is yet another object of this invention to provide hydrodynamic thrust bearings as set forth in an earlier object and wherein at least one of the rigid flat bearing surfaces is coated with a thin layer of an elastomer whereby said layer will pick up small foreign particles that may be in the lubricant.

The foregoing and additional objects and advantages will become apparent when taken in connection with the following drawings and detailed description showing by way of example at least one preferred embodiment of the invention.

IN THE DRAWING

Figure 4:
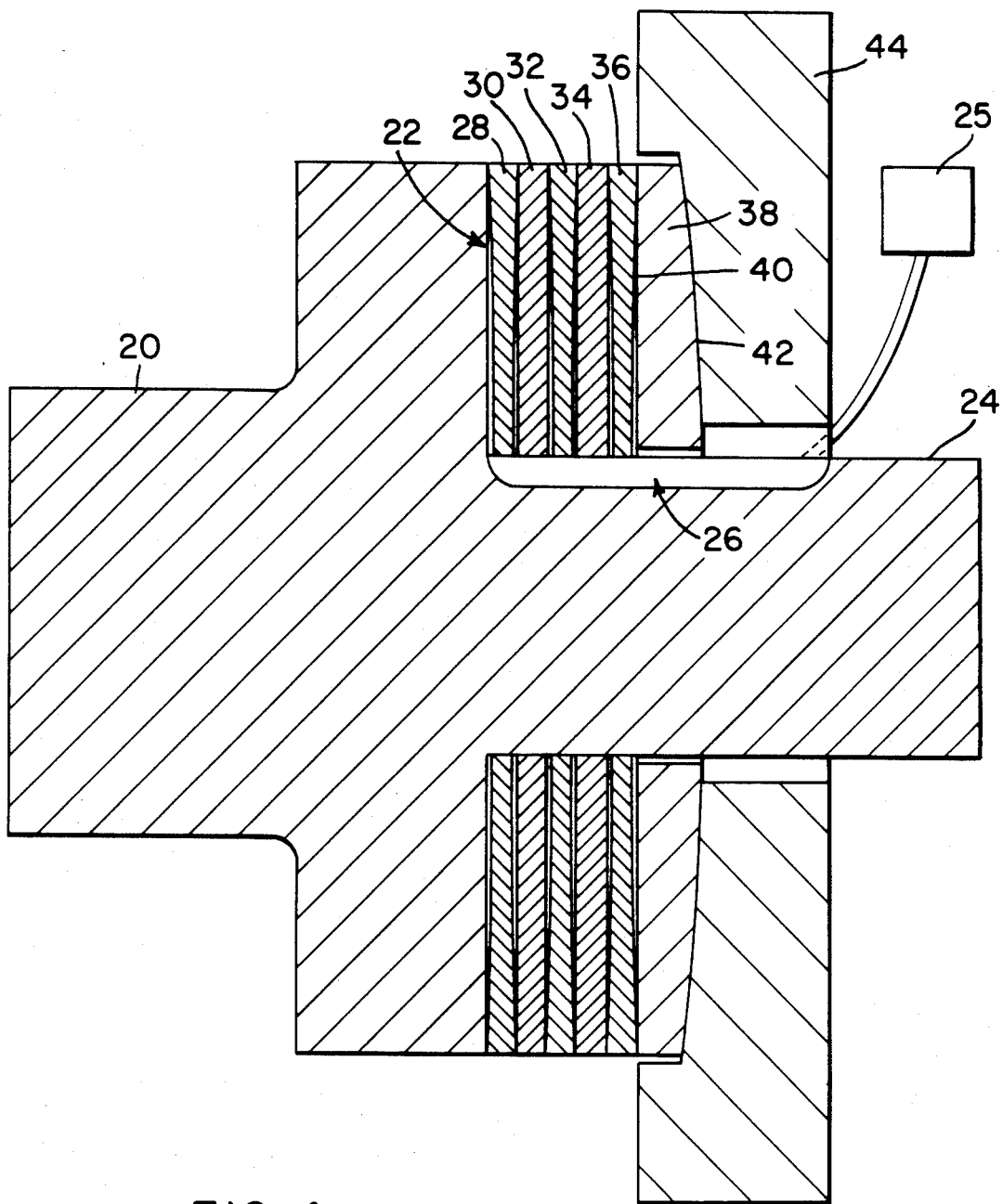
Figure 5:
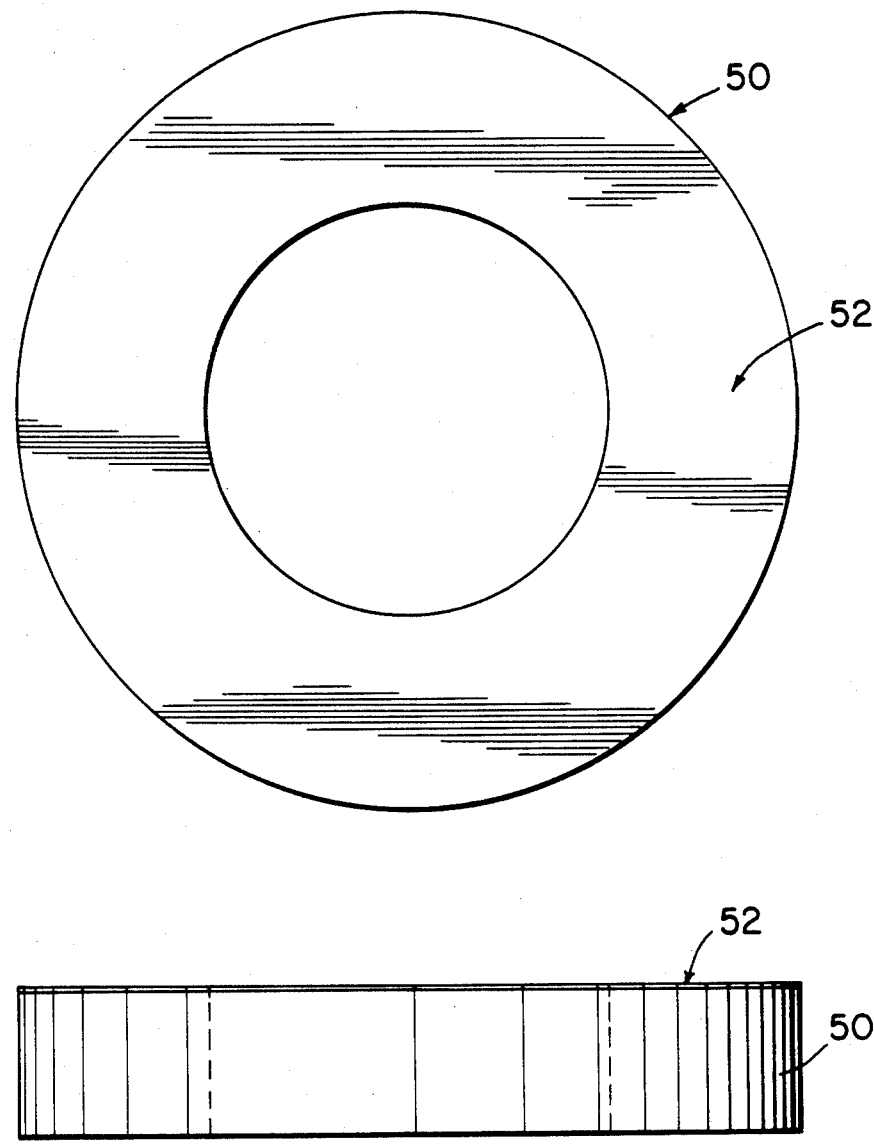
Figure 6:
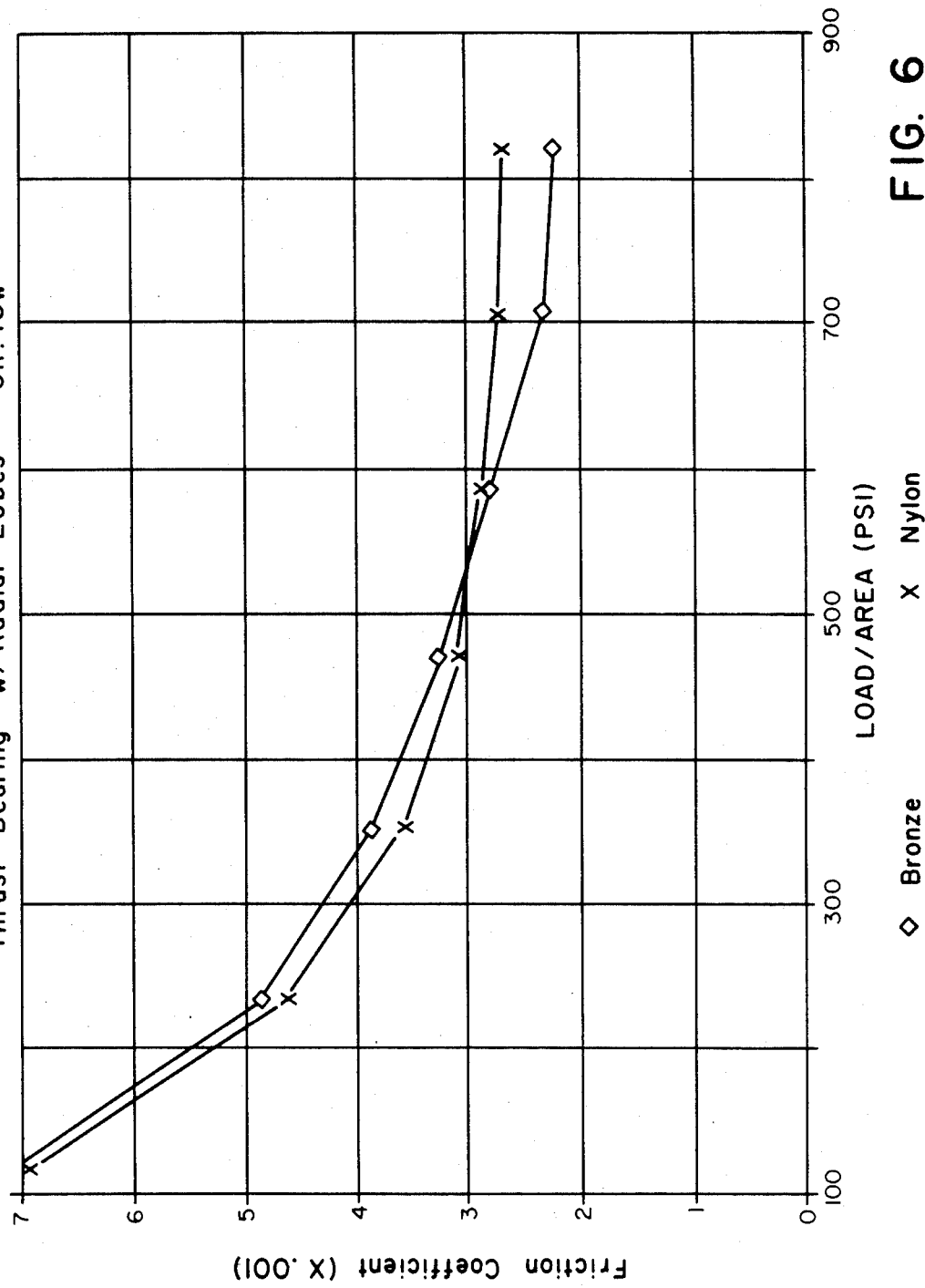

FIG. 4 shows a stack of wavy disk thrust bearings and flat disks for supporting thrust with reduced friction, FIG. 5 shows a flat disk designed for cooperation with a wavy disk thrust bearing which has a thin, smooth elastomer layer on its surfaces, and FIG. 6 shows coefficient of friction versus thrust data for a wavy disk bearing in a test fixture with a brass wavy disk sliding against both a smooth steel thrust surface and as steel thrust surface coated with a very thin layer of elastomer.

DETAILED DESCRIPTION

Figure 1:
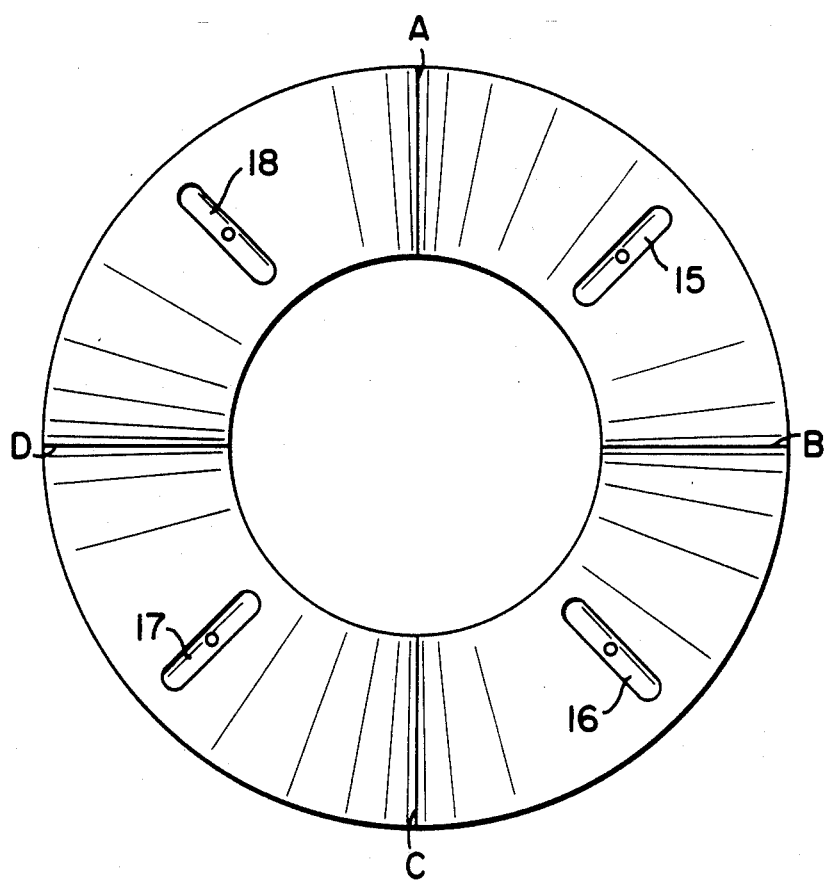
FIG. 1 is a plan view of one of the thrust bearing disks wherein the disk is provided with four complete undulations.

FIG. 1 shows a plan view of the wavy disk thrust bearing 10. The view shows schematically four radial waves, A, B, C and D each wave a similar smooth curve, for example a sinusoidal curve, having a peak-to-valley height of 0.006"–0.0005" depending on loading conditions. As such a wavy disk bearing rotates in the presence of oil against a planar surface, each wave acts as a smooth hydrodynamic bearing. As the surface loading of such a bearing increases, Hertzian deformation of the contacting curved surfaces acts to greatly increase the radius of curvature of the waves against the coacting plane. Since hydrodynamic load-bearing capacity of cylinder on flat plate bearings, which these waves in effect are, increases linearly with cylindrical radius of curvature, this deformation is highly favorable to load capacity. On the scales relevant to hydrodynamic fluid mechanics, these bearings are variable geometry bearings with excellent load-bearing capacity. Radial grooves, 15, 16, 17, and 18 in the low portions of the wave assist in lubricating the thrust bearing.

Figure 2:
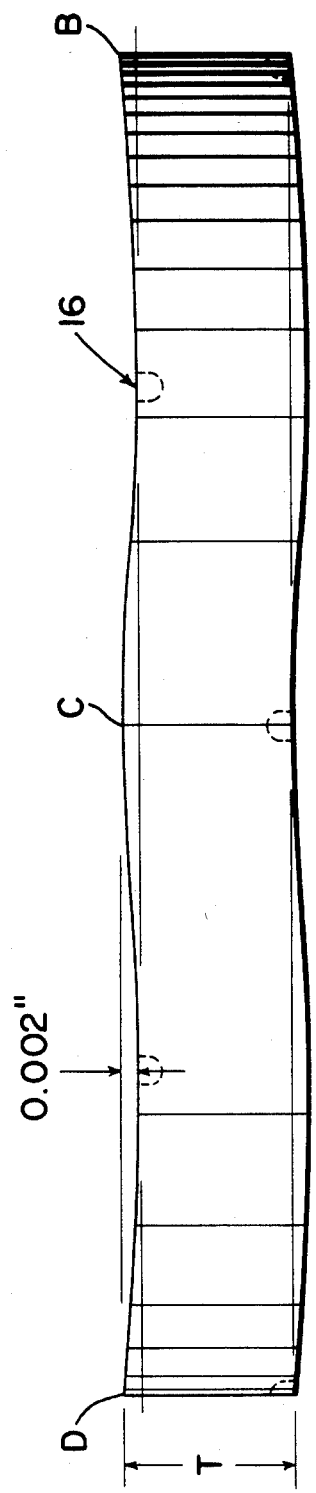
FIG. 2 is a view of one half the perimeter of the bearing disk. It is shown flattened at so the undulations or waves on the bearing disk surface can be seen.

FIG. 2 is an elevational view of one half of the perimeter of the bearing disk. It is shown flattened out so the undulation or waves on the bearing are shown clearly as they exist on both sides of the thrust bearing disk 10. As depicted in FIG. 2, the distance from the low to the peak of an undulation is approximately 0.002" while the disk is about 0.500" in thickness "T". The disk faces are each provided with several radial grooves such as 15–18, as seen in FIG. 1, to provide lubrication to the interface between the undulating disk surface and the rigid flat surface of a base bearing. The radial grooves are provided with lubricant from any convenience source and therefore such has not been shown in FIG. 2.

It is believed that the wavy disk thrust bearing can be manufactured quite inexpensively, and it is envisioned that wavy disk thrust bearings can best be made by stamping out of flat metal disks.

Figure 3:
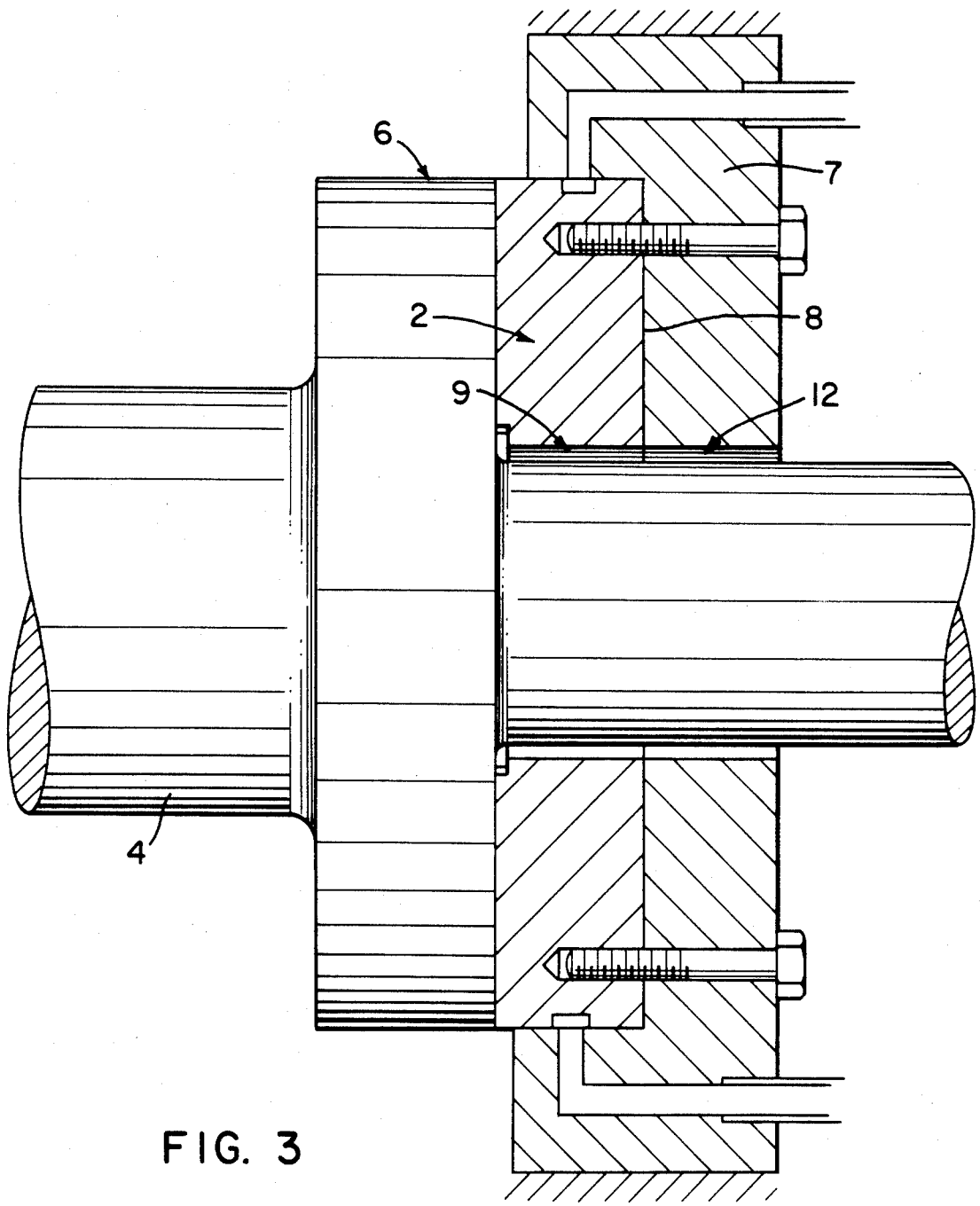
FIG. 3 shows a wavy disk thrust bearing supporting thrust on a rotating shaft.

FIG. 3 shows a disk thrust bearing 2, supporting thrust on rotating shaft 4, having planar thrust section 6, and acting against block 7 having a rigid planar surface 8. Shaft 4 passes through a central hole 9 in thrust bearing 2 and through high clearance receiver hole 12 in block 7. The assembly is submerged in oil.

The assembly of FIG. 3 illustrates how the wavy thrust bearing 2 may be mounted as a thrust bearing, but does not illustrate the reduced friction or increased load capacity of a stack of such wavy thrust bearings. FIG. 3 also does not show how positive lubrication of these bearings may be obtained. Nor does it show how slight degrees of non-parallelism between the thrust receiving block and the wavy disk may be accommodated.

FIG. 4 does show these things. Rotating shaft 20 has planar thrust section 22 and shaft extension 24. Groove 26 in shaft 24 is fed from a source of pressurized oil 25 and feeds oil to the inner surfaces of disks 28, 30, 32, 34, 36 which disks are located as shown on shaft 24. Disks 28, 32, and 36 are thin, doubled-sided wavy disks. Co-acting disks 30 and 34 have rigid smooth planar surfaces. Radial grooves are provided at the low points of the surface waves to assist bearing lubrication. Thrust forces from wavy disk 36 act on thrust receiving bushing 38 which has planar surface 40 co-acting with wavy disk 36 and hemispherical surface 42 co-acting with a corresponding hemispherical receiver surface in thrust receiving block 44.

The arrangement shown in FIG. 4 is capable of supporting heavy thrust laods over a very wide speed range. By increasing the number of stacked wavy disks, rotating speeds well in excess of those tolerable with heavily loaded ball or roller thrust bearings are possible.

An arrangement such as that of FIG. 4 on both ends of a shaft, or against a disk-shaped enlarged portion of a shaft, can take thrust in both directions.

The wavy disk thrust bearing does not require any better oil filtration than analogous journal bearings. However, the startup and scoring characteristics of these bearings can be substantially improved if the wavy surface acts against a thin layer of elastomer, for example, polyurethane. FIG. 5 shows rigid flat disk 50 with a thin elastomer layer 52 designed for cooperation with a wavy disk thrust bearing. The advantages of elastomer surface bearings have been well set out by Professor Dudley D. Fuller on pages 452–468 of his admirable test, *Theory and Practice of Lubrication for Engineers*, John Wiley & Sons, 1984. However, the elastomer surface Fuller described are typically 0.100" or more thick. Elastomer layers bonded to metallic surfaces act analogously to hydrodynamic squeeze films with the time dependence in the equations removed and G, the elastomer shear modulus substituted for U, the viscosity in the equations. Therefore, the effective stiffness of the elastomer layer is proportional to $\frac{1}{t}$ where t is the elastomer thickness. The preferred elastomer thickness of the present invention is t=0.030"–0.005". The elastomer layer has greatly increased stiffness in combination with a continuing ability to embed particles without damage. Disks such as flat disk 50 is therefore highly advantageous in stacked thrust bearing assemblies which operate at low enough temperatures to not harm the elastomer.

FIG. 6 shows coefficient of friction versus thrust data for a wavy disk bearing in a test fixture with the brass wavy disk sliding against a smooth steel thrust surface and a thrust surface coated with a 0.008" layer of nylon. The disk was 4.0" in diameter with four radial waves between 2.5" diameter and 4.0" diameter. The wave height of the bearing wave was 0.002". The test was run on 10 weight oil. The test was conducted squeezing two wavy disks against a disk-shaped plate by hydraulic means. The central steel plate (in one case with a nylon surface and in another case with a smooth steel surface) was rotated with a drive including a sensitive torque cell, and the total torque, divided in two since there were two plates, was translated into coefficient of friction and plotted in FIG. 6. The nylon had a machined surface which was much rougher than the steel plate surface, and it is believed that the increased friction at high loads with the nylon versus and steel surfaces is due to this cause, rather than to any inherent disadvantage of the nylon. The elastomer-coated surface is much better than the steel surface with respect to embeddibility.

It should be noted that the thrust bearing disk illustrated in FIGS. 1 and 2 could be made with only one undulating surface and the other flat. There are many installations wherein the one undulating surface will provide all of the thrust support needed. This would be particularly true in situations wherein the fore aft movement is slight and only light loads are involved.

What is claimed is:

1. A hydrodynamic thrust bearing adapted for positioning between a fixed base and a moving member spaced from said fixed base, the moving member having a rigid flat face confronting the fixed base, said hydrodynamic thrust bearing comprising:
  a. a thin metal disk having a center and a surface on each side of said disk,
  b. said disk having undulations including low and high areas extending radially outward from the center of the disk in a symmetrical manner throughout one entire surface of the metal disk, and a planar face on the other side,
  c. the disk being positioned between the fixed base and the rigid flat face of the moving member whereby the undulations of said disk are in contact with said rigid flat face and the planar face is in contact with the fixed base,
  d. means for providing lubricant between the disk undulations and the confronting rigid flat face of the moving member, whereby thrust movement relative to the disk will produce a very thin film of lubricant between the undulations of the disk and the cooperating rigid flat face of the moving member, and
  e. the rigid flat face of the moving member being coated with a thin film of plastic.

2. The invention as set forth in claim 1 and wherein the plastic film is polyurethane and is 0.030" or less in thickness.

3. A hydrodynamic thrust bearing adapted for positioning between a fixed base with a rigid flat planar bearing surface and a moving member spaced from said fixed base and having a rigid flat planar face confronting the rigid flat planar bearing surface of the base, and hydrodynamic thrust bearing comprising:
  a. a thin metal disk,
  b. said disk having undulations extending radially outward from the center of the disk in a symmetrical manner throughout both surfaces of the disk,
  c. lubricant supply grooves in one or more of the low areas of the undulations on both surfaces of the disk,
  d. means for providing said grooves with lubricant, whereby face and aft pressure between the fixed base and moving member will produce a very thin film of lubricant between the undulating surface and its respective flat surface.

4. The invention as set forth in claim 3 and wherein a plurality of thin metal disks are provided with rigid flat bearing disks interposed between adjacent thin metal disks whereby each undulating surface will be in contact with the surface of a rigid flat bearing disk.

5. The invention as set forth in claim 3 and the rigid flat faces in contact with the undulating surfaces are coated with a plastic having a thickness of 0.030" or less.

* * * * *